(12) United States Patent
Zhou et al.

(10) Patent No.: US 11,476,751 B2
(45) Date of Patent: Oct. 18, 2022

(54) SHORT CIRCUIT CURRENT SUPPRESSION CIRCUIT FOR FLYING CAPACITOR CONVERTER AND ENERGY STORAGE SYSTEM HAVING THE SAME

(71) Applicant: Delta Electronics (Shanghai) Co., Ltd., Shanghai (CN)

(72) Inventors: Yuhu Zhou, Shanghai (CN); Haidong Chen, Shanghai (CN); Guoqiao Shen, Shanghai (CN); Jinfa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 24 days.

(21) Appl. No.: 17/152,747

(22) Filed: Jan. 19, 2021

(65) Prior Publication Data

US 2021/0336529 A1    Oct. 28, 2021

(30) Foreign Application Priority Data

Apr. 24, 2020  (CN) .......................... 202010334464.1

(51) Int. Cl.

| H02M 1/32 | (2007.01) |
|---|---|
| H02M 3/158 | (2006.01) |
| H01H 71/12 | (2006.01) |
| H02H 3/087 | (2006.01) |
| H02M 3/07 | (2006.01) |
| H02M 1/00 | (2006.01) |

(52) U.S. Cl.
CPC ............ *H02M 1/32* (2013.01); *H01H 71/123* (2013.01); *H02H 3/087* (2013.01); *H02M 3/07* (2013.01); *H02M 3/158* (2013.01); *H02M 1/0009* (2021.05)

(58) Field of Classification Search
CPC ........ H02M 1/32; H02M 1/0009; H02M 3/158; H02M 3/07; H02H 3/087; H01H 71/23
See application file for complete search history.

(56) References Cited

U.S. PATENT DOCUMENTS 8,427,113 B2 *   4/2013   Xing .................... H02J 7/00711
                                                320/140

FOREIGN PATENT DOCUMENTS

| CN | 104795989 B | 7/2017 |
|---|---|---|
| CN | 107070191 A | 8/2017 |

* cited by examiner

*Primary Examiner* — Rafael O De Leon Domenech
(74) *Attorney, Agent, or Firm* — CKC & Partners Co., LLC

(57) ABSTRACT

The present invention discloses a flying capacitor converter, a short circuit current suppression circuit for the same and an energy storage system. The flying capacitor converter comprises a controller, and has a high voltage side connected to a first power source and a low voltage side connected to a second power source. The short circuit current suppression circuit comprises: at least one current detection unit connected to the low voltage side and/or the high voltage side of the flying capacitor converter; and at least one switch set connected in series to the high voltage side and/or the low voltage side of the flying capacitor converter, wherein the controller controls the switch set to cut off a connection between the flying capacitor converter and the first power source and/or between the flying capacitor converter and the second power source, when the current detection unit detects a short circuit.

11 Claims, 3 Drawing Sheets

SHORT CIRCUIT CURRENT SUPPRESSION CIRCUIT FOR FLYING CAPACITOR CONVERTER AND ENERGY STORAGE SYSTEM HAVING THE SAME

CROSS-REFERENCE TO RELATED APPLICATIONS

This non-provisional application claims priority under 35 U.S.C. § 119(a) on Patent Application No. 202010334464.1 filed in P.R. China on Apr. 24, 2020, the entire contents of which are hereby incorporated by reference.

BACKGROUND OF THE INVENTION

1. Field of the Invention

The invention relates to a short circuit current suppression circuit, and particularly, to a short circuit current suppression circuit for a flying capacitor converter, a flying capacitor converter having the short circuit current suppression circuit, and an energy storage system having the flying capacitor converter.

2. Related Art

The flying capacitor converter has been widely applied to an energy storage system. As shown in FIG. 1, a plurality of flying capacitor converters (e.g., n converters including converter #1, converter #2, . . . , and converter #n shown in FIG. 1) have one end connected to a DC power grid or a DC common bus, and other end connected to energy storage elements, such as supercapacitors or batteries (e.g., n batteries including Battery-1, Battery-2, . . . , and Battery-n shown in FIG. 1).

In application, a DC common bus is connected with a plurality of flying capacitor converters for charging and discharging a plurality of energy storage elements, respectively. When a short circuit occurs on one of the converters, the short circuit current provided by the single converter may be a few hundred amperes. However, since the plurality of converters are connected in parallel, each of the converters provides the short circuit current to a short circuit point, and the value of the short circuit current depends on the number of converters connected in parallel. When the number of converters connected in parallel increases, a large short circuit current will damage some devices by overcurrent and overheat. And if the short circuit current cannot be timely eliminated, a large short circuit accident or fire disaster may occur.

For example, in FIG. 1, when a short circuit occurs inside one flying capacitor converter, such as, between nodes a and b of the converter #2 (shown by an arrow between the nodes a and b in FIG. 1), the system may have the following issues:

(1) The diode D1/D2 inside the failed converter cannot cut off the short circuit current from the energy storage element.

(2) The DC common bus is shorted, and thus other converters are shorted, resulting in failure of the entire system.

(3) All these short circuit currents of other converters flow to the short circuit point of the failed converter #2 on which the short circuit occurs. For example, when the short circuit current of each converter is 100 A, if one hundred converters are connected in parallel, a total short circuit current flowing through the short circuit point is 10 kA, such that a fuse of the failed converter on which the short circuit occurs cannot be effectively turned off due to the huge total short circuit current.

(4) The mechanical components of the failed converter on which the short circuit occurs are damaged by overheat due to the huge total short circuit current.

(5) Considering the huge total short circuit current, when the converter is designed, it is difficult to select a device satisfying the short circuit capacity, or it is required to select a device having a large short circuit capacity, thereby increasing the cost of the converter.

(6) The total short circuit current does not flow through the bus fuses on the DC common bus, such as the fuse Fuse_a/Fuse_b, and will not trigger the protection from the fuse Fuse_a/Fuse_b.

Therefore, it is urgent to develop and design a short circuit current suppression circuit for a flying capacitor converter, which is capable of quickly suppressing a short circuit current of a single converter.

SUMMARY OF THE INVENTION

An object of the present invention is to provide a flying capacitor converter, a short circuit current suppression circuit for the same and an energy storage system, which can quickly suppress a short circuit current of a single converter.

To achieve the above object, the present invention provides a short circuit current suppression circuit for a flying capacitor converter, the flying capacitor converter comprising at least one main switch and a controller, and having a high voltage side connected to a first power source and a low voltage side connected to a second power source, the short circuit current suppression circuit comprising: at least one current detection unit connected to the low voltage side and/or the high voltage side of the flying capacitor converter; and at least one switch set connected in series to the high voltage side and/or the low voltage side of the flying capacitor converter, wherein the controller controls the switch set to cut off a connection between the flying capacitor converter and the first power source and/or between the flying capacitor converter and the second power source, when the current detection unit detects a short circuit.

To achieve the above object, the present invention further provides a flying capacitor converter, having a high voltage side and a low voltage side, and the flying capacitor converter comprising at least one main switch, a controller and a short circuit current suppression circuit, the short circuit current suppression circuit comprising: at least one current detection unit connected to the low voltage side and/or the high voltage side of the flying capacitor converter; and at least one switch set connected in series to the high voltage side and/or the low voltage side of the flying capacitor converter; wherein when the current detection unit detects a short circuit, the controller controls the switch set to cut off a connection between the flying capacitor converter and the first power source and/or between the flying capacitor converter and the second power source.

To achieve the above object, the present invention further provides an energy storage system, comprising: a plurality of flying capacitor converters described above; a power source having a positive terminal connected to a positive input terminal at a high voltage side of each of the flying capacitor converters, and a negative terminal connected to a negative input terminal at the high voltage side of each of the flying capacitor converters; and a plurality of energy storage elements, each connected between a positive output terminal and a negative output terminal at a low voltage side of each of the flying capacitor converters.

The additional aspects and advantages of the present invention are partially explained in the below description, partially become apparent from the description, or can be obtained through practice of the invention.

BRIEF DESCRIPTION OF THE DRAWINGS

The exemplary embodiments are described in detail with reference to the accompanying drawings, through which the above and other features and advantages of the invention will become more apparent.

DETAILED EMBODIMENTS OF THE INVENTION

Figure 1:
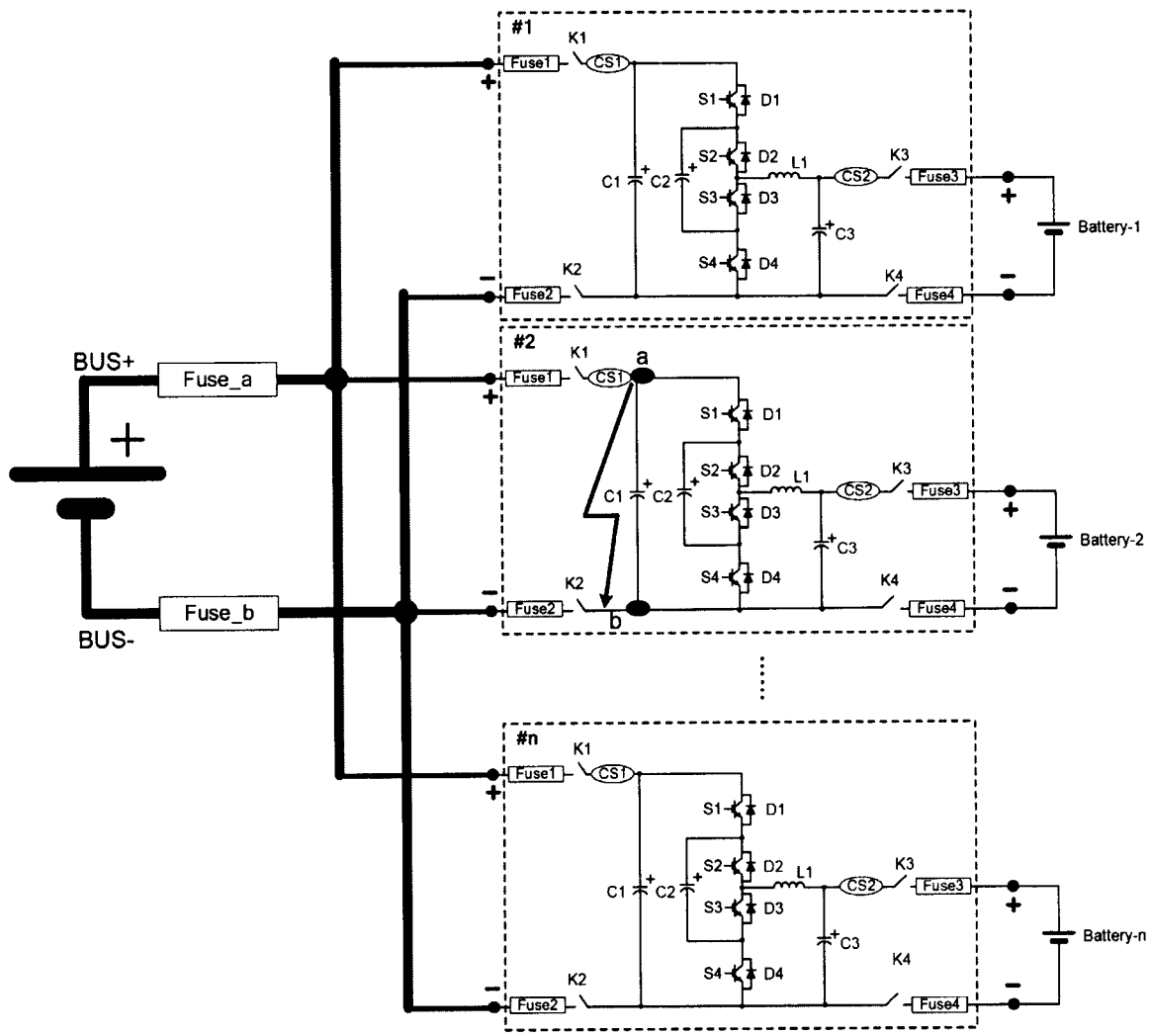
FIG. 1 is a diagram showing a circuit structure of an energy storage system having a plurality of flying capacitor converters according to the prior art.

The exemplary embodiments will now be described more fully with reference to the accompanying drawings. However, the exemplary embodiments can be implemented in various forms and should not be limited to the embodiments set forth herein; on the contrary, these embodiments are provided so that the present invention will be thorough and complete, and the conception of exemplary embodiments will be fully conveyed to those skilled in the art. In the drawings, the same reference numeral denotes the same or similar structure, so their detailed description will be omitted.

When elements/components described and/or illustrated herein are introduced, the terms "one", "a(an)", "the", "said" and "at least one" refer to the existence of one or more elements/components. The terms "include", "comprise" and "have" refer to an open meaning, and the existence of additional elements/components in addition to the listed elements/components. Relative terms, such as "upper" or "lower", may be used to describe a relative relation of one component and another component. It should be understood that if the illustrated device reverses to turn upside down, a component on an "upper" side of the device will become a component on a "lower" side of the device. In addition, the terms "first", "second" and the like in the claims are only used as signs, instead of numeral limitations to an object.

The flying capacitor converter of the present invention includes a controller. The flying capacitor converter has a high voltage side connected to a first power source and a low voltage side connected to a second power source. The flying capacitor converter of the present invention further includes a short circuit current suppression circuit, and the short circuit current suppression circuit includes at least one current detection unit and at least one switch set. The at least one current detection unit is connected to the low voltage side and/or the high voltage side of the flying capacitor converter, and the at least one switch set is connected in series to the high voltage side and/or the low voltage side of the flying capacitor converter. When the current detection unit detects a short circuit, the controller of the flying capacitor converter can control the switch set to cut off a connection between the flying capacitor converter and the first power source and/or between the flying capacitor converter and the second power source. Accordingly, the present invention can effectively suppress a short circuit current of the flying capacitor converter, and can bypass the failed converter by controlling the switch set to be turned off.

Figure 2:
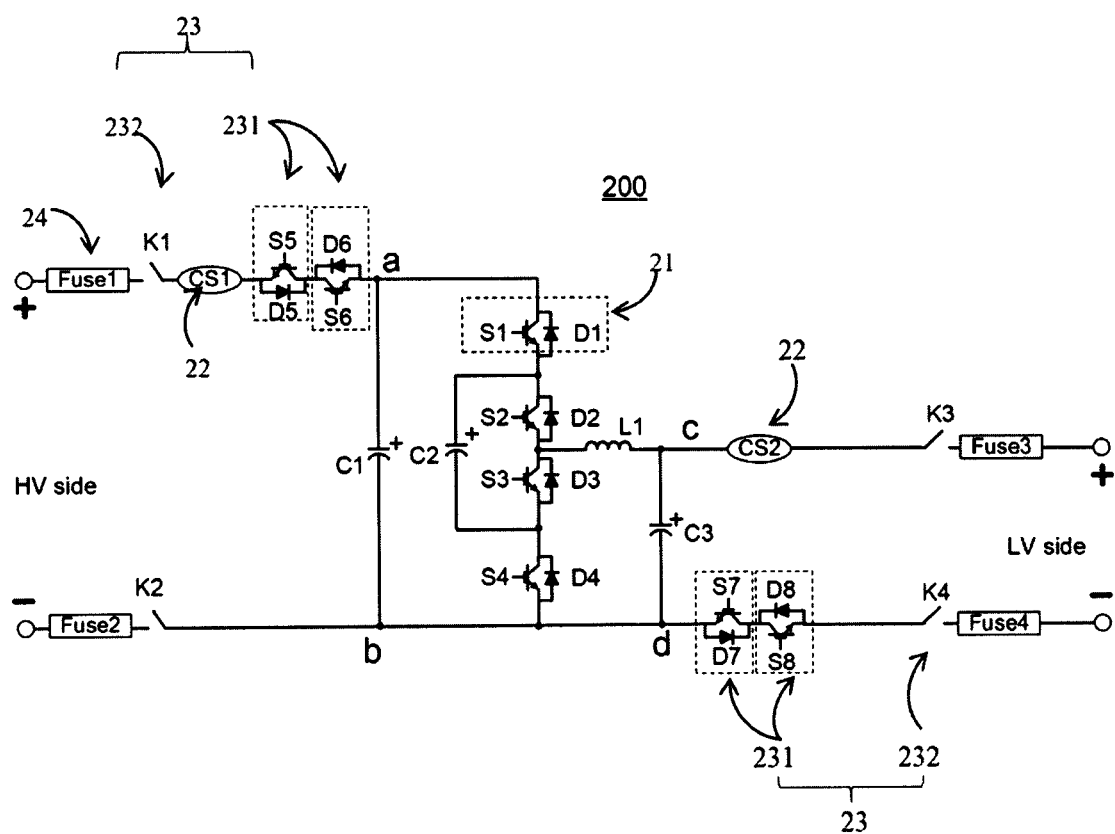
FIG. 2 is a diagram showing a circuit structure of a flying capacitor converter with a short circuit current suppression circuit according to an embodiment of the present invention.

FIG. 2 is a diagram showing a circuit structure of a flying capacitor converter with a short circuit current suppression circuit according to an embodiment of the present invention. In the embodiment shown in FIG. 2, the flying capacitor converter 200 includes four main switches 21 sequentially connected in series, such as a first main switch S1/D1, a second main switch S2/D2, a third main switch S3/D3 and a fourth main switch S4/D4. The first main switch S1/D1 is coupled to a positive pole at a high voltage side (HV side), and the fourth main switch S4/D4 is coupled to a negative pole at the high voltage side (HV side). Taking the first main switch S1/D1 for example, it includes a controllable switch S1 and a diode D1. The diode D1 can be a body diode of the controllable switch S1, or can be an external diode. The flying capacitor converter 200 further includes a controller (not shown) connected to the main switches S1/D1, S2/D2, S3/D3 and S4/D4. The flying capacitor converter 200 further includes an inductor L1, an input capacitor C1, a flying capacitor C2 and an output capacitor C3. The input capacitor C1 is coupled to the high voltage side (HV side), i.e., connected between a node a and a node b. The flying capacitor C2 has two ends, one end is connected with a connection point between the first main switch (S1/D1) and the second main switch (S2/D2), and the other end is connected with a connection point between the third main switch (S3/D3) and the fourth main switch (S4/D4). The inductor L1 has two ends, one end is connected with a connection point between the second main switch (S2/D2) and the third main switch (S3/D3), and the other end is coupled to the low voltage side (LV side). The output capacitor C3 is coupled to a low voltage side (LV side), i.e., connected between a node c and a node d. Accordingly, the flying capacitor converter may have three levels. In other embodiment, the flying capacitor converter may have other circuit structure having multiple levels known by those skilled in the art, such as a five-level flying capacitor converter, but the present invention is not limited thereto.

In some embodiments, the flying capacitor converter 200 of the present invention further includes a short circuit current suppression circuit, the short circuit current suppression circuit includes at least one current detection unit 22 connected to the low voltage side and/or the high voltage side of the flying capacitor converter 200, and at least one switch set 23 connected in series to the high voltage side and/or the low voltage side of the flying capacitor converter 200. As shown in FIG. 2, the short circuit current suppression circuit includes two current detection unit 22, such as current detection units CS1 and CS2, which are connected to the high voltage side and the low voltage side of the flying capacitor converter 200 respectively, and configured to detect currents at the high voltage side and the low voltage side respectively. The short circuit current suppression circuit further includes two switch set 23 connected in series to the high voltage side and the low voltage side of the flying capacitor converter 200, respectively. Each of the switch sets 23 may include two electronic switches 231, for example, a first switch set includes two electronic switches S5/D5 and S6/D6 at the high voltage side, and a second switch set includes two electronic switches S7/D7 and S8/D8 at the low voltage side. The two electronic switches 231 (such as S5/D5 and S6/D6) are reversely connected in series and connected to the controller of the flying capacitor converter

200. Taking the electronic switch S5/D5 at the high voltage side for example, it includes a controllable switch S5 and a diode D5. The diode D5 can be a body diode of the controllable switch S5, or can be an external diode of the controllable switch S5. The controller of the flying capacitor converter 200 is connected to the electronic switches S5/D5, S6/D6, S7/D7 and S8/D8, respectively. When driving signals applied to the electronic switches S5/D5, S6/D6, S7/D7 and S8/D8 have a high level, these electronic switches S5/D5, S6/D6, S7/D7 and S8/D8 are turned on, and when the driving signals have a low level, these electronic switches S5/D5, S6/D6, S7/D7 and S8/D8 are turned off.

In some embodiments, the electronic switches 231 of the switch set 23 and the main switches 21 can be S1 MOSFET, SiC MOSFET, GaN FET, IGBT or solid state circuit breaker.

Further, in some embodiments, each of the switch sets 23 further includes mechanical switches 232 connected in series to the two electronic switches 231 at the high voltage side and the low voltage side, respectively. For example, the mechanical switch K1, the current detection unit CS1 and the electronic switches S5/D5 and S6/D6 are disposed on a positive bus at the high voltage side, the mechanical switch K4 and the electronic switches S5/D5 and S6/D6 are disposed on a negative bus at the low voltage side, and the current detection unit CS2 is disposed on the positive bus at the low voltage side.

Further, the mechanical switch K2 can be disposed on the negative bus at the high voltage side, and the mechanical switch K3 can be disposed on the positive bus at the low voltage side. Further, a fuse 24, such as fuse Fuse1, Fuse2, Fuse3, Fuse4, can be disposed on the positive bus and the negative bus at the high voltage side, and the positive bus and the negative bus at the low voltage side, respectively. Moreover, the controller of the flying capacitor converter 200 can be connected to the mechanical switches K1 to K4 to control the mechanical switches.

In the embodiment shown in FIG. 2, the flying capacitor converter 200 of the present invention may have the high voltage side connected to a first power source, and the low voltage side connected to a second power source.

In the present invention, the current detection unit 22, when detecting a short circuit, can determine whether the short circuit occurs inside or outside the flying capacitor converter 200 based on a direction of a detected current. Moreover, when the current detection unit 22 detects a short circuit, the controller of the flying capacitor converter can control the electronic switch 231 to be turned off. Further, the controller of the flying capacitor converter controls the mechanical switch 232 connected in series to the electronic switch 231 to be turned off when the short circuit occurs inside the flying capacitor converter.

For example, in FIG. 2, when the flying capacitor converter 200 operates normally, the high voltage side and the low voltage side are connected with a power source or an energy storage element. When a short circuit occurs, the current detection units CS1 and CS2 detect that the short circuit current value is larger than a certain value, and the controller quickly controls the electronic switches S5/D5, S6/D6, S7/D7 and S8/D8 to be turned off.

Specifically, the current detection units CS1 and CS2 inside the converter 200 can detect a direction of the short circuit current to determine whether the short circuit occurs inside or outside the converter.

If the short circuit occurs outside the converter, such as between positive and negative terminals at the high voltage side, the current detection unit CS1 detects an increase of the current. When the detected current reaches a threshold value for overcurrent protection, an overcurrent protection signal may be generated by a fast hardware comparison circuit, and then the controller will turn off the electronic switches S5/D5, S6/D6, S7/D7 and S8/D8 to cut off the connection with the high voltage side, thereby rapidly cutting off the short circuit current from the capacitor inside the converter and the energy storage element at the low voltage side. Accordingly, the short circuit loop can be cut off before the protection from the fuse, thereby preventing the fuses Fuse1 and Fuse2, and the mechanical switches K1 and K2 from being damaged by overcurrent.

If the short circuit occurs inside the converter, such as between the node a and the node b, the current detection unit CS1 detects an increase of the current. When the detected current reaches a threshold value for overcurrent protection, an overcurrent protection signal may be generated by a fast hardware comparison circuit, and then the controller of the converter will rapidly turn off the electronic switches S5/D5, S6/D6, S7/D7 and S8/D8 to cut off the short circuit loop, and then the controller of the converter 200 will turn off the mechanical switches K1, K2, K3 and K4 to cut off the failed converter, such that the failure of short circuit is limited inside the converter, thereby ensuring the stable operation of other converter in the system.

Figure 3:
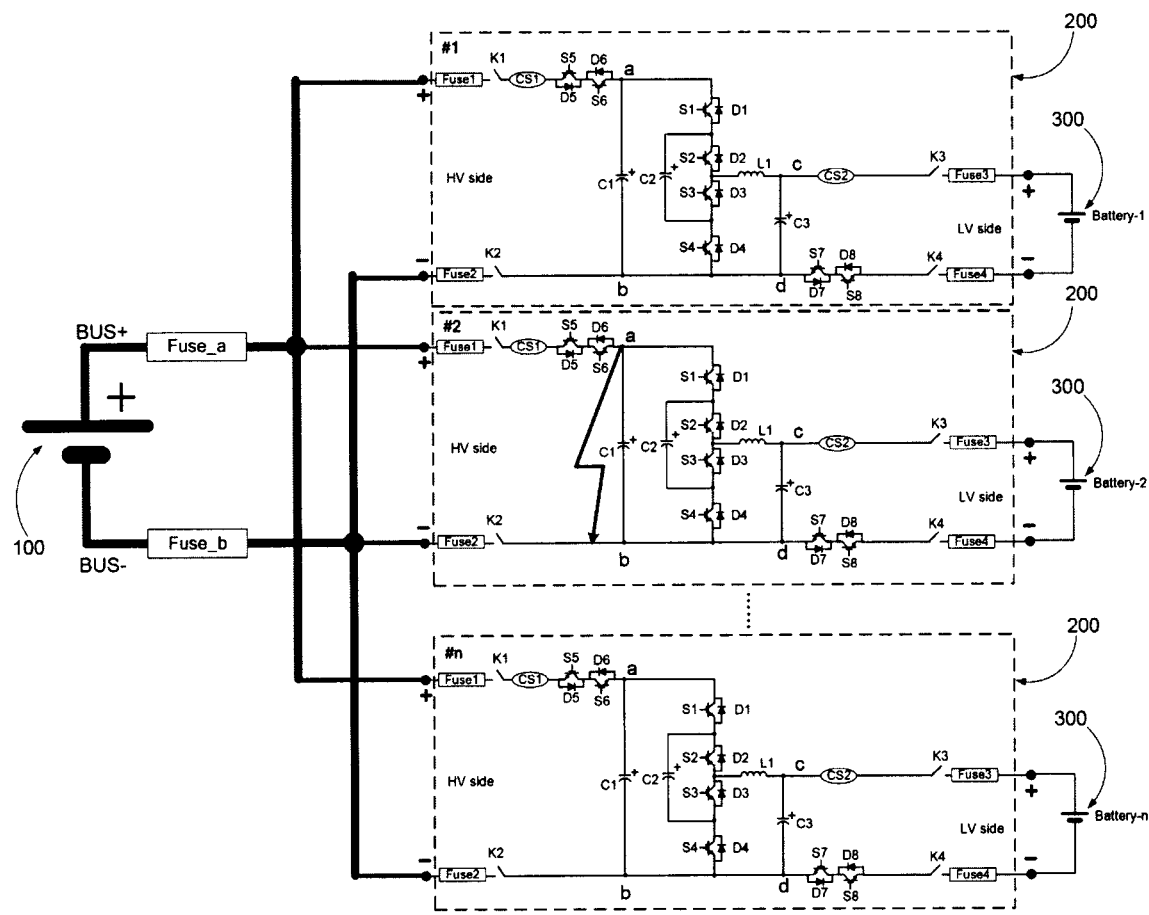
FIG. 3 is a diagram showing a circuit structure of an energy storage system having the flying capacitor converter shown in FIG. 2 according to the present invention.

FIG. 3 is a diagram showing a circuit structure of an energy storage system having the flying capacitor converter shown in FIG. 2 according to the present invention. The energy storage system of the present invention includes a power source 100, a plurality of flying capacitor converters 200 and a plurality of energy storage elements 300. The plurality of flying capacitor converters 200, such as n converters including converter #1, converter #2, . . . , converter #n, each may have a structure shown in FIG. 2. The power source 100, such as a DC power grid or a DC common bus, has a positive terminal BUS+ connected to a positive input terminal at a high voltage side of each of the flying capacitor converters 200, and a negative terminal BUS− connected to a negative input terminal at the high voltage side of each of the flying capacitor converters 200. Each of the energy storage elements 300, such as a battery, is connected between a positive output terminal and a negative output terminal at a low voltage side of each of the flying capacitor converters 200.

Hereinafter, advantages of the energy storage system of the present invention will be further described with reference to FIG. 3.

(1) For example, when the short circuit occurs between the node a and the node b of the converter #2, the controller of the converter #2 turns off the electronic switches S5/D5, S6/D6, S7/D7 and S8/D8 to cut off the connection with the high voltage side after detecting the short circuit current, thereby preventing the short circuit from occurring in other converter connected in parallel to the converter #2.

(2) For example, when the short circuit occurs inside the converter #2, the controller of the converter #2 rapidly turns off the electronic switches S5/D5, S6/D6, S7/D7 and S8/D8 to cut off the short circuit loop, and then the controller of the converter #2 sends an instruction to turn off the mechanical switches K1, K2, K3 and K4 to disconnect the failed converter (i.e., the converter #2), such that the failure of short circuit is limited inside the converter #2, thereby ensuring the stable operation of other converter in the system.

(3) The converter of the present invention further includes the electronic switches S5/D5, S6/D6, S7/D7 and S8/D8, which reduces a short circuit capacity of the fuse of the converter, and reduces the cost of the device.

The flying capacitor converter of the present invention can rapidly suppress short circuit current of the flying capacitor converter by a short circuit current suppression circuit, which can reduce the short circuit capacity of the devices inside the converter, and improve the short circuit reliability of an energy storage system having a plurality of flying capacitor converters. When one converter in the energy storage system fails, the failed converter can be bypassed, so as to ensure a stable operation of the system.

The flying capacitor converter of the present invention can be applied to various fields including rail traffic, electric power, new energy power generation, distributed energy storage and high power drive.

Exemplary embodiments of the present invention have been illustrated and described above. It should be understood that the present invention is not limited to the disclosed embodiments. Instead, the present invention intends to cover various modifications and equivalents included in the spirit and scope of the appended claims.

What is claimed is:

1. A short circuit current suppression circuit for a flying capacitor converter, the flying capacitor converter comprising at least one main switch and a controller, and having a high voltage side connected to a first power source and a low voltage side connected to a second power source, the short circuit current suppression circuit comprising:
   at least one current detection unit connected to the low voltage side and/or the high voltage side of the flying capacitor converter; and
   at least one set of switches connected in series to the high voltage side and/or the low voltage side of the flying capacitor converter;
   wherein when the current detection unit detects a short circuit, the controller controls the at least one set of switches to cut off a connection between the flying capacitor converter and the first power source and/or between the flying capacitor converter and the second power source,
   wherein each of the at least one set of switches comprises two electronic switches reversely connected in series and connected to the controller of the flying capacitor converter, and at least one mechanical switch connected in series to the two electronic switches.

2. The short circuit current suppression circuit of claim 1, wherein the current detection unit determines whether the short circuit occurs inside or outside the flying capacitor converter based on a direction of a detected current when detecting the short circuit.

3. The short circuit current suppression circuit of claim 2, wherein the controller controls the mechanical switch to be turned off, when the short circuit occurs inside the flying capacitor converter.

4. The short circuit current suppression circuit of claim 1, wherein the controller controls the two electronic switches to be turned off, when the current detection unit detects a short circuit.

5. The short circuit current suppression circuit of claim 1, wherein the flying capacitor converter is a three-level flying capacitor converter comprising a first main switch, a second main switch, a third main switch and a fourth main switch sequentially connected in series, an inductor and a flying capacitor; the first main switch is coupled to a positive pole at the high voltage side, and the fourth main switch is coupled to a negative pole at the high voltage side; one end of the flying capacitor is connected with a connection point between the first main switch and the second main switch, the other end of the flying capacitor is connected with a connection point between the third main switch and the fourth main switch; and a connection point between the second main switch and the third main switch is coupled to the low voltage side through the inductor.

6. The short circuit current suppression circuit of claim 1, wherein the flying capacitor converter is a multi-level flying capacitor converter comprising a plurality of main switches sequentially connected in series and a plurality of flying capacitors.

7. The short circuit current suppression circuit of claim 1, wherein the main switch and the electronic switch comprise at least one of Si MOSFET, SiC MOSFET, GaN FET, IGBT or solid state circuit breaker.

8. A flying capacitor converter, having a high voltage side and a low voltage side, and the flying capacitor converter comprising at least one main switch, a controller and a short circuit current suppression circuit, the short circuit current suppression circuit comprising:
   at least one current detection unit connected to the low voltage side and/or the high voltage side of the flying capacitor converter; and
   at least one set of switches connected in series to the high voltage side and/or the low voltage side of the flying capacitor converter;
   wherein when the current detection unit detects a short circuit, the controller controls the at least one set of switches to cut off a connection between the flying capacitor converter and a first power source and/or between the flying capacitor converter and a second power source,
   wherein each of the at least one set of switches comprises two electronic switches reversely connected in series and connected to the controller of the flying capacitor converter, and at least one mechanical switch connected in series to the two electronic switches.

9. An energy storage system, comprising:
   a plurality of flying capacitor converters of claim 8;
   the first power source having a positive terminal connected to a positive input terminal at a high voltage side of each of the flying capacitor converters, and a negative terminal connected to a negative input terminal at the high voltage side of each of the flying capacitor converters; and
   a plurality of energy storage elements, each connected between a positive output terminal and a negative output terminal at a low voltage side of each of the flying capacitor converters.

10. The energy storage system of claim 9, wherein the power source is a DC power grid or a DC common bus, and the plurality of energy storage elements are batteries or super capacitors.

11. The flying capacitor converter of claim 8, wherein the first power source is connected to the high voltage side of the flying capacitor convert and the second power source is connected to the low voltage side of the flying capacitor converter.

* * * * *